United States Patent [19]

Nakano

[11] Patent Number: 4,966,254

[45] Date of Patent: Oct. 30, 1990

[54] APPARATUS FOR CONVERTING EXTRINSIC USELESS OSCILLATION MOTIONS INTO USEFUL TORQUE

[76] Inventor: Kazuo Nakano, 1-8-19, Mishuku, Setagaya-ku, Tokyo, Japan

[21] Appl. No.: 365,888

[22] Filed: Jun. 14, 1989

[30] Foreign Application Priority Data

Mar. 31, 1989 [JP] Japan .................... 1-78649

[51] Int. Cl.$^5$ .................... F03G 3/06; F03G 1/08; F16H 29/00
[52] U.S. Cl. .................... 185/30; 74/143; 185/39
[58] Field of Search .................... 185/30, 39; 74/126, 74/143; 60/499; 417/330, 331, 332; 290/42, 53

[56] References Cited

U.S. PATENT DOCUMENTS

| 613,075 | 10/1898 | Pitts | 185/30 X |
| 1,674,885 | 6/1928 | Bryant | 60/499 |
| 1,682,176 | 8/1928 | Hegenbarth | 185/30 |
| 1,925,742 | 9/1933 | Bamber et al. | 185/30 |
| 4,352,023 | 9/1982 | Sachs et al. | 290/53 X |
| 4,438,343 | 3/1984 | Marken | 417/332 X |

FOREIGN PATENT DOCUMENTS

| 2523654 | 9/1983 | France | 290/53 |
| 1562174 | 3/1980 | United Kingdom | 290/53 |

Primary Examiner—Allan D. Herrmann
Attorney, Agent, or Firm—Armstrong, Nikaido, Marmelstein, Kubovcik & Murray

[57] ABSTRACT

An apparatus for converting oscillation motions such as those of ocean waves into a constant torque, comprises: a stationary frame 1 fixedly mounted on a floor of an apparatus's carrier such as marine vessels; a pair of horizontal rotating axles 3, 5 substantially perpendicular to each other, one 3 of which axles 3, 5 is rotatably mounted on the stationary frame 1 while the other 5 is rotatably mounted on the first one 3; swinging pendulums 2, 7a, 7b each of which is fixedly mounted on each of the rotating axles 3, 5 for driving the rotating axles 3, 5 under the influence of the extrinsic oscillation motions to which the swinging pendulums 2, 7a, 7b are subjected; one-way clutches 8a, 8b, 22 and 17 mounted on each of the rotating axles 3, 5 and an auxiliary axle 15 for converting rotation of each of the axles 33, 5 into a unidirectional rotation of each of the one-way clutches 8a, 8b, 22 and 17; and a gear train 13, 25, 26 29 for combining the rotations of the one-way clutches 8a, 8b, 22 and 17 into a rotation of a torque-output shaft 28.

3 Claims, 5 Drawing Sheets

FIG. I
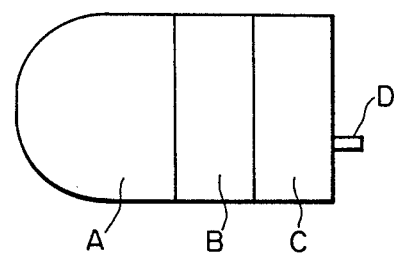
FIG. 2
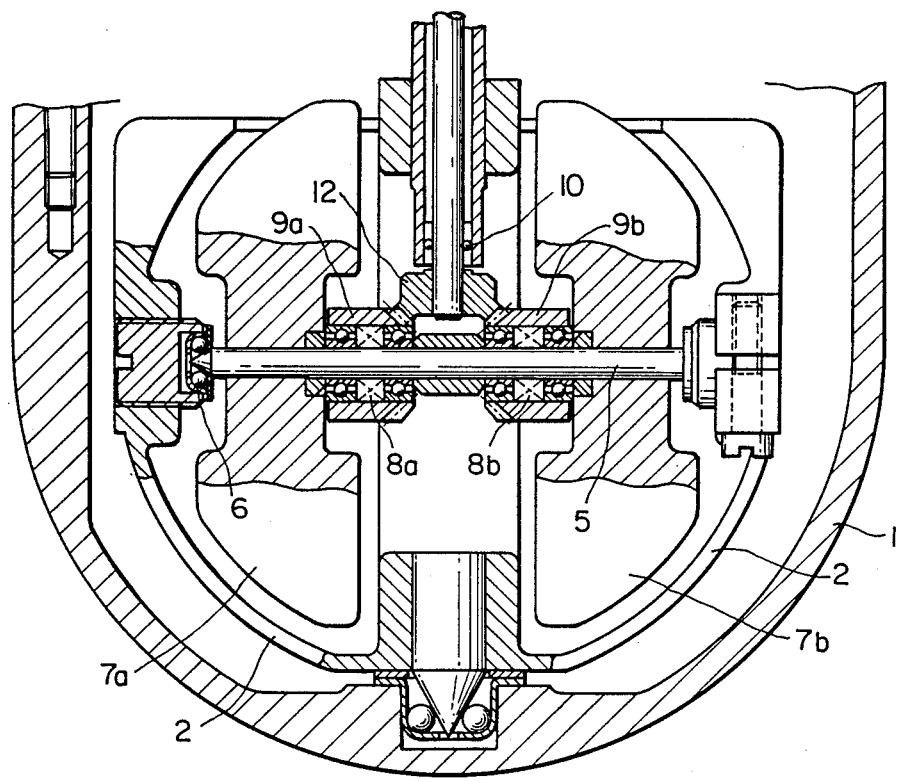

4,966,254

APPARATUS FOR CONVERTING EXTRINSIC USELESS OSCILLATION MOTIONS INTO USEFUL TORQUE

BACKGROUND OF THE INVENTION

1. Field of the Invention

The present invention relates to an apparatus for converting extrinsic useless oscillation motions such as those of ocean waves into a useful torque, which apparatus is provided with a stationary frame fixedly mounted on a supporting floor of an apparatus's carrier such as marine vessels and the like, in which stationary frame of the apparatus swingably mounted a pair of swinging pendulums subjected to the extrinsic oscillation motions observed in natural phenomena such as ocean waves, wind and the like or the other natural or artificial oscillation motions, so that the swinging pendulums mounted in the stationary frame of the apparatus are swingably driven in the substantially same way as that of gyroscope's gimbals through the extrinsic oscillation motions to produce a useful torque for driving a desired instrument such as an electric generator and like instruments.

2. Description of the Prior Art

Hitherto, in some of vehicles such as marine vessels, land vehicles and the like subjected to extrinsic useless oscillation motions such as those of ocean waves and the like, an apparatus provided with swinging pendulums has been fixedly mounted in the vehicles to convert the extrinsic oscillation motions swingably driving its swinging pendulums into a useful torque for driving a desired instrument.

In the above-mentioned conventional apparatus, a pair of swinging pendulums are usually employed, a first one of which pendulums is swingably mounted on a first horizontal axle, and the other or a second one of which pendulums is swingably mounted on a second horizontal axle perpendicular to the first horizontal axle, to enable each of the swinging pendulums to produce a torque giving each of their horizontal axles a unidirectional rotation.

However, in such conventional apparatus, since the horizontal axles are individually driven, it is difficult to combine both of the unidirectional rotations of the horizontal axles into a single powerful driving force or torque. In other words, in the conventional apparatus, the unidirectional rotations of the horizontal axles remain uncombined to fail to produce a powerful driving force or torque.

In order to resolve the above disadvantage, there has been proposed another conventional apparatus provided with a pair of bevel gears which are rotatably mounted on a common axle through a pair of unidirectional rotating means or one-way clutches while oppositely disposed from each other, between which pair of the bevel gears another bevel gear fixedly mounted on a torque-output shaft is interposed so as to be meshed with both of the pair of bevel gears mounted on the common axle. The one-way clutches enable the pair of bevel gears to rotate on the common axle in opposite directions counter to each other, which makes it possible to rotate the torque-output shaft in only one direction when the common axle is rotatably driven under the influence of extrinsic oscillation motions to which the apparatus is subjected. The common axle of the conventional apparatus is rotatably driven by the swinging pendulums rotatably mounted on the common axle through the one-way clutches. Consequently, in another conventional apparatus, the torque-output shaft is rotatably driven only in a plane perpendicular to a plane in which the swinging pendulums are swingably driven under the influence of the extrinsic oscillation motions.

In addition, in general, since the extrinsic oscillation motions vary in amplitude, direction and cycle every moment, the swinging pendulums of the conventional apparatus also vary in rotational angle, swinging speed and swinging cycle every moment to make it difficult to convert the extrinsic oscillation motions into a constant powerful driving force or torque.

SUMMARY OF THE INVENTION

It is a first object of the present invention to provide an apparatus for converting extrinsic useless oscillation motions such as those of ocean waves and the like into a useful constant torque, in which apparatus are provided a pair of horizontal rotating axles perpendicular to each other. In the apparatus of the present invention, swinging pendulums are fixedly mounted on each of the horizontal rotating axles rotatably mounted on a stationary frame of the apparatus so that the extrinsic oscillation motions to which the stationary frame of the apparatus are subjected are converted into a constant powerful driving force or constant torque through the swinging pendulums disposed perpendicularly to each other in the apparatus of the present invention, the constant driving force or torque being outputted through a torque-output shaft of the apparatus of the present invention.

It is a second object of the present invention to provide an apparatus for converting extrinsic useless oscillation motions such as those of ocean waves and the like into a useful constant torque, in which apparatus the torque-output shaft may be extended in any desired direction in construction with respect to the rotating axles to which the swinging pendulums are fixedly mounted.

It is a third object of the present invention to provide an apparatus for converting extrinsic useless oscillation motions such as those of ocean waves and the like into a useful constant torque, in which apparatus the torque produced therein is temporally accumulated in a power spring which releases a constant torque from the apparatus to drive a desired instrument such as an electric generator.

According to the present invention, there is provided:

An apparatus for converting extrinsic useless oscillation motions such as those of ocean waves and the like into a useful constant torque, comprising:

- a stationary frame fixedly mounted on a supporting floor of an apparatus's carrier such as marine vessels and the like;
- a pair of horizontal rotating axles substantially perpendicular to each other, one of which axles is rotatably mounted on said stationary frame of said apparatus to constitute a first rotating axle while the other of which axles is rotatably mounted on said first rotating axle to constitute a second rotating axle;
- swinging pendulums each of which is fixedly mounted on each of said rotating axles for rotatably driving said rotating axles under the influence of said extrinsic oscillation motions to which said swinging pendulums are subjected;

a unidirectional rotating means mounted on each of said rotating axles and an auxiliary axle for converting rotational motions of each of said rotating axles into a unidirectional rotation of said unidirectional rotating means; and a gear train for combining said unidirectional rotations of said unidirectional rotating means into a unidirectional rotation of a torque-output shaft.

According to the present invention, there is further provided:

An apparatus for converting extrinsic useless oscillation motions such as those of ocean waves and the like into a useful constant torque, comprising:

a stationary frame fixedly mounted on a supporting floor of an apparatus's carrier such as marine vessels and the like;

a first rotating axle rotatably mounted on said stationary frame, which axle is swingably driven by a first swinging pendulum under the influence of said extrinsic useless oscillation motions, said first swinging pendulum being fixedly mounted on said first rotating axle;

a first unidirectional-rotation gear rotatably mounted on an auxiliary axle through a unidirectional rotating means on which is fixedly mounted an intermediate gear meshed with a primary gear fixedly mounted on said first rotating axle; and a second unidirectional-rotation gear rotatably mounted on said first rotating axle through a unidirectional rotating means so as to be driven by said first rotating axle in the same direction as that of said first unidirectional-rotation gear;

said first and second unidirectional-rotation gears being meshed with a torque-output gear fixedly mounted on a main shaft.

According to the present invention, there is still further provided:

An apparatus for converting extrinsic useless oscillation motions into a useful torque, comprising:

a stationary frame fixedly mounted on a supporting floor of an apparatus's carrier such as marine vessels and the like;

a pair of horizontal rotating axles substantially perpendicular to each other, one of which axles is rotatably mounted on said stationary frame of said apparatus to constitute a first rotating axle while the other of which axles is rotatably mounted on said first rotating axle to constitute a second rotating axle, on which axles a pair of swinging pendulums are fixedly mounted, said rotating axles being rotatably driven by said swinging pendulums under the influence of said extrinsic useless oscillation motions;

a main shaft for being rotatably driven by said rotating axles and an auxiliary axle through unidirectional-rotating means;

a power spring axle to which an inner end portion of a power spring is fixedly mounted, said power spring being driven by said power spring axle;

a power spring gear to which an outer end portion of said power spring is fixedly mounted, said power spring gear being rotatably mounted on said power spring axle;

a ratchet wheel rotatably driven together with a ratchet gear of a gear train meshed with said power spring gear;

a detent means for preventing said ratchet wheel from rotating; and a releasing means for releasing said ratchet wheel from said detent means, said releasing means being fixedly mounted on a gear meshed with a gear of said power spring axle.

As is clear from the above, according to the present invention, the swinging pendulums fixedly mounted on the pair of the horizontal rotating axles which are substantially perpendicular to each other are swingably driven in the apparatus of the present invention in the substantially same way as that of gyroscope's gimbals under the influence of the extrinsic oscillation motions such as those of ocean waves and the like to give the bevel gears of the horizontal rotating axles the unidirectional rotations which are combined into a unidirectional rotation of the main shaft or torque-output shaft of the apparatus of the present invention, through which torque-output shaft a constant powerful driving force or torque is supplied to a desired instrument such as an electric generator.

In addition, in the apparatus of the present invention, since the torque-output shaft may extend in any desired direction with respect to those of the horizontal rotating axles, the apparatus of the present invention is excellent in versatility in design.

Furthermore, in the apparatus of the present invention, the torque of the torque-output shaft is temporally accumulated in a power spring until the thus accumulated torque reaches a predetermined value, and then a torque of more than the predetermined value is released from the power spring at a stretch to enable the power spring to drive even a heavy-load instrument, the power spring being also able to drive the heavy-load instrument at a constant speed through a constant-speed driving unit.

As described above, the apparatus of the present invention is very simple in construction, and efficiently converts the extrinsic useless oscillation motions such as those of ocean waves and the like into a useful constant torque. Consequently, the user can employ the apparatus of the present invention in marine vessels constantly subjected to the oscillation motions of ocean waves, and also in land vehicles constantly subjected to vibrations. In addition, the apparatus of the present invention can be employed as a portable or man-carrying apparatus for converting walking motions of the user into a useful constant torque.

BRIEF DESCRIPTION OF THE DRAWINGS

FIG. 1 is a plan view of an embodiment of the apparatus of the present invention for converting the extrinsic useless oscillation motions such as those of ocean waves and the like into a useful constant torque which is temporally accumulated in a power spring of the embodiment of the apparatus of the present invention;

FIG. 2 is a partially broken plan view of the swinging pendulum section of the apparatus of the present invention;

DESCRIPTION OF THE PREFERRED EMBODIMENTS

An embodiment of an apparatus of the present invention for converting extrinsic useless oscillation motions such as those of ocean waves and the like into a useful constant torque will be hereinbelow described in detail with reference to the drawings. Of course, it is clear that the present invention is not limited to this embodiment only.

Figure 3:
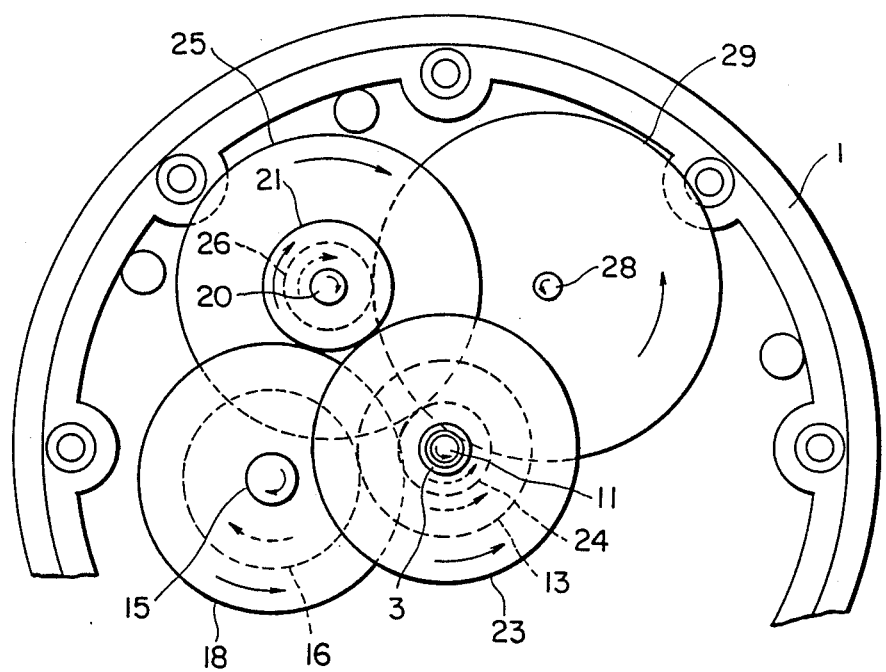
FIG. 3 is a front view of a gear train combined with the swinging pendulum section of the apparatus of the present invention, the gear train being adapted to give a torque-output shaft of the apparatus of the present invention a unidirectional rotation.
Figure 4:
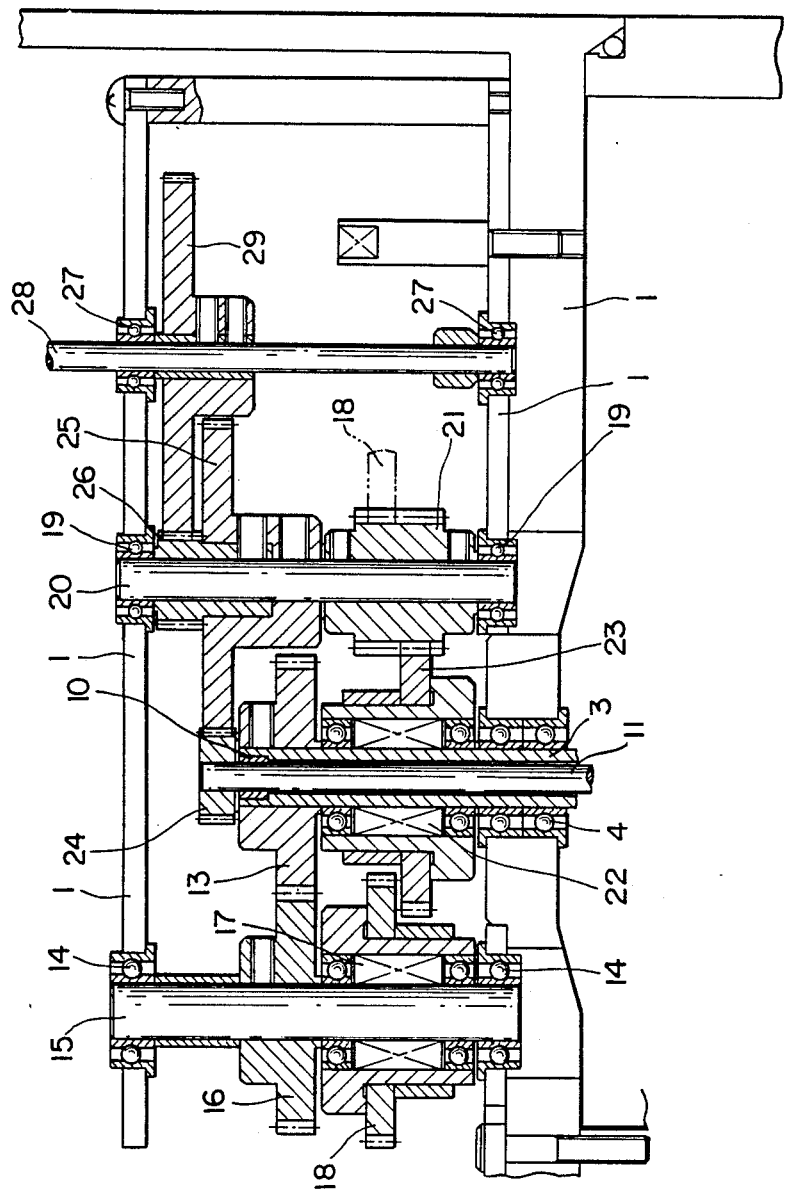
FIG. 4 is a side view of the gear train of the apparatus of the present invention.

In FIG. 1, the reference character "A" denotes a swinging pendulum section of the embodiment of the apparatus of the present invention;"B" a gearing section of the embodiment, shown in FIGS. 3 and 4; "C" a power spring section of the embodiment, shown in FIGS. 5 to 7; and "D" a torque-output shaft.

In FIG. 2, the reference numeral 1 denotes a stationary frame of the apparatus of the present invention, the stationary frame 1 being fixedly mounted on a supporting floor of a suitable apparatus's carrier such as marine vessels, buoys, land vehicles and the like. As shown in FIG. 4, in the stationary frame 1 of the apparatus is horizontally and rotatably mounted first or hollow rotating axle 3 through a bearing 4, on which hollow rotating axle 3 a first swinging pendulum 2 is fixedly mounted.

In the first swinging pendulum 2, another or a second horizontal rotating axle 5 is rotatably mounted through a pair of bearings 6 as shown in FIG. 2, so as to assume the substantially same configuration of that of a gyroscope's gimbals. Consequently, the other rotating axle 5 is so arranged as to be substantially perpendicular to the hollow rotating axle 3 as shown in FIG. 2. On opposite end portions of the other rotating axle 5 are fixedly mounted a pair of second swinging pendulums 7a and 7b, respectively.

As shown in FIG. 2, a pair of bevel gears 9a and 9b are rotatably mounted on the second rotating axle 5 through a pair of unidirectional rotating means or one-way clutches 8a and 8b respectively while oppositely disposed from each other so as to be able to rotate in opposite directions counter to each other.

Interposed between these bevel gears 9a, 9b so as to be meshed therewith is another bevel gear 12 which is fixedly mounted on an end portion of a central axle 11 which is coaxially and rotatably mounted in the first or hollow axle 3 through a pair of bearings 10 mounted in the hollow axle 3.

Consequently, in case that the stationary frame 1 of the apparatus of the present invention swings in a plane perpendicular to an axis of the hollow axle 3, the first swinging pendulum 2 swings also in the above plane relative to the stationary frame 1 so as to keep its horizontal position, whereby the hollow axle 3 is rotatably driven by the first swinging pendulum 2 relative to the stationary frame 1 of the apparatus.

On the other hand, in case that the stationary frame 1 of the apparatus swings in another plane perpendicular to an axis of the rotating axle 5, the second swinging pendulums 7a, 7b swing in the above another plane relative to the stationary frame 1 and the second swinging pendulum 2 so that the second rotating axle 5 is rotatably driven by the second swinging pendulums 7a, 7b relative to the stationary frame 1 or the second swinging pendulum 2.

In this case, since the pair of bevel gears 9a and 9b are rotatably mounted on the second rotating axle 5 through the pair of one-way clutches 8a and 8b respectively while oppositely disposed from each other so as to be able to rotate in opposite directions counter to each other, when one of the bevel gears 9a, 9b drives the bevel gear 12 of the central axle 11 under the influence of the extrinsic oscillation motions, the other of the bevel gears 9a, 9b is driven by the bevel gear 12 of the central axle 11 to freely rotate on the second rotating axle 5.

Consequently, when the other of the bevel gears 9a, 9b drives the bevel gear 12 of the central axle 11 under the influence of the extrinsic oscillation motions, the first one of bevel gears 9a, 9b is driven by the bevel gear 12 of the central axle 11 to freely rotate on the second rotating axle 5.

As a result, the central axle 11 is rotatably driven constantly in only one direction through its bevel gear 12 meshed with both of the bevel gears 9a, 9b which are rotatably driven by the swinging pendulums 7a, 7b under the influence of the extrinsic oscillation motions.

In FIGS. 3 and 4, the reference numeral 13 denotes a gear fixedly mounted on the first or hollow axle in which the central axle 11 is coaxially and rotatably mounted. The gear 13 of the hollow axle 3 is meshed with a gear 16 fixedly mounted on an auxiliary axle 15 which is rotatably mounted on the stationary frame 1 through a pair of bearings 14.

As shown in FIG. 4, another gear 18 is rotatably mounted on the auxiliary axle 15 through a unidirectional rotating means or one-way clutch 17. The gear 18 is meshed with a gear 21 fixedly mounted on a first main shaft 20 which is rotatably mounted on the stationary frame 1 through a pair of bearings 19 as shown in FIG. 4.

Also on the hollow axle 3, a gear 23 is rotatably mounted through a unidirectional rotating means or one-way clutch 22, which gear 23 is also meshed with the gear 21 of the first main shaft 20 described above.

The auxiliary axle 15 and the hollow axle 3 are adapted to drive the gears 18 and 23 through the one-way clutches 17 and 22, respectively, so as to give the gear 21 of the first main shaft 20 a unidirectional rotation.

Consequently, in case that the hollow axle 3 is rotatably driven in a direction by the swinging pendulum 2, the gear 23 is rotatably driven by the hollow axle 3 through the one-way clutch 22 in the above direction so as to give the first shaft 20 a unidirectional rotation through the gear 21. The unidirectional rotation of the first main shaft 20 is also transmitted to the gear 18 to freely rotate the same 18 on the auxiliary axle 15 through the one-way clutch 17. As is clear from the above description, the unidirectional rotation of the first main shaft 20 transmitted to the gear 18 through the gear 21 does not interfere with the unidirectional rotation of the auxiliary axle 15 at all.

In case that the hollow axle 3 is rotatably driven in the other direction counter to the above direction by the swinging pendulum 2, the gear 13 fixed to the hollow axle 3 drives the gear 16 fixed to the auxiliary axle 15. The thus transmitted rotation of the auxiliary axle 15 is transmitted to the gear 18 through the one-way clutch 17 so that the gear 21 fixed to the first main shaft 20 is rotatably driven by the gear 18 in the same direction as that of the previous case.

As this time, the gear 23 is rotatably driven by the gear 21 as is clear from FIG. 4, however, the rotation of the gear 21 transmitted to the gear 23 is prevented from being transmitted to the hollow axle 3 by the one-way clutch 22.

As described above, when the hollow axle 3 is rotatably driven by the swinging pendulum 2 under the influence of the extrinsic oscillation motions, the unidirectional rotation of the hollow axle 3 is transmitted to the first main shaft 20 so as to give the same 20 a unidirectional rotation.

In addition, as is clear from FIG. 4, a gear 24 is fixedly mounted on the central axle 11 passing through the hollow axle 3. The gear 24 of the central axle 11 is meshed with a gear 25 fixedly mounted on the first main shaft 20. Consequently, when the central axle 11 is rotatably driven in a direction through the second pendulums 7a, 7b and the one-way clutches 8a, 8b, such unidirectional rotation of the central axle 11 is transmitted tot he main shaft 20 through the gears 24, 25 without interfering with the unidirectional rotation of the first main shaft 20.

As described above, when at least one of the first swinging pendulum 2 and the second swinging pendulums 7a, 7b is swingably driven under the influence of the extrinsic oscillation motions, the first main shaft 20 is constantly and rotatably driven in only one direction.

As shown in FIG. 4, a gear 26 is coaxially fixed to the gear 25 on the first main shaft 20. On the other hand, a second main shaft 28 is rotatably mounted on the stationary frame 1 through a pair of bearings 27. The gear 26 of the first main shaft 20 is meshed with a gear 29 fixedly mounted on the second main shaft 28 so that the unidirectional rotation of the first main shaft 20 is transmitted to the second main shaft 28.

Figure 5:
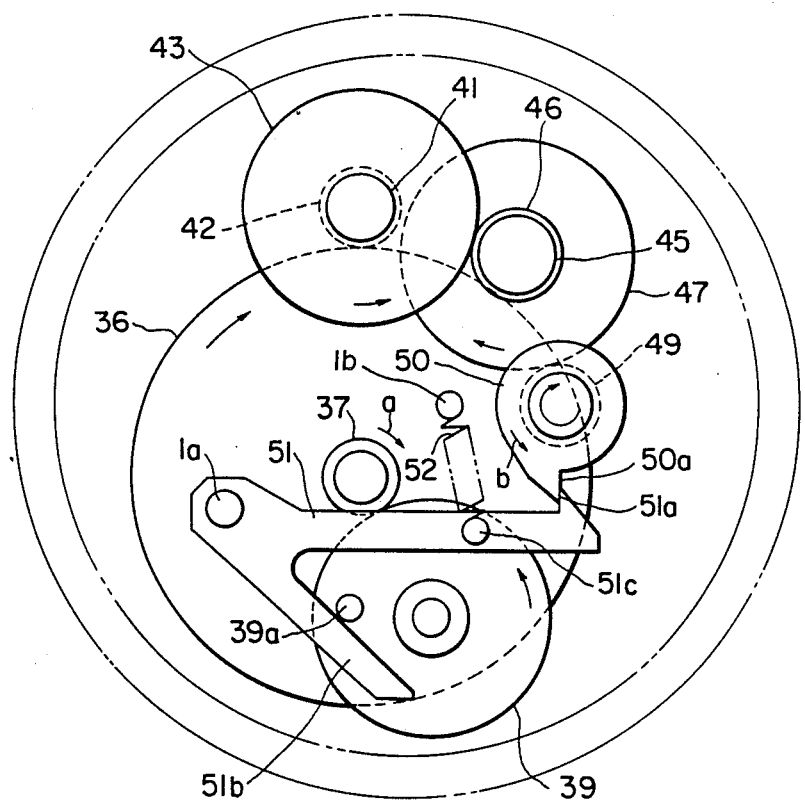
FIG. 5 is a front view of a power spring section of the apparatus of the present invention.
Figure 6:
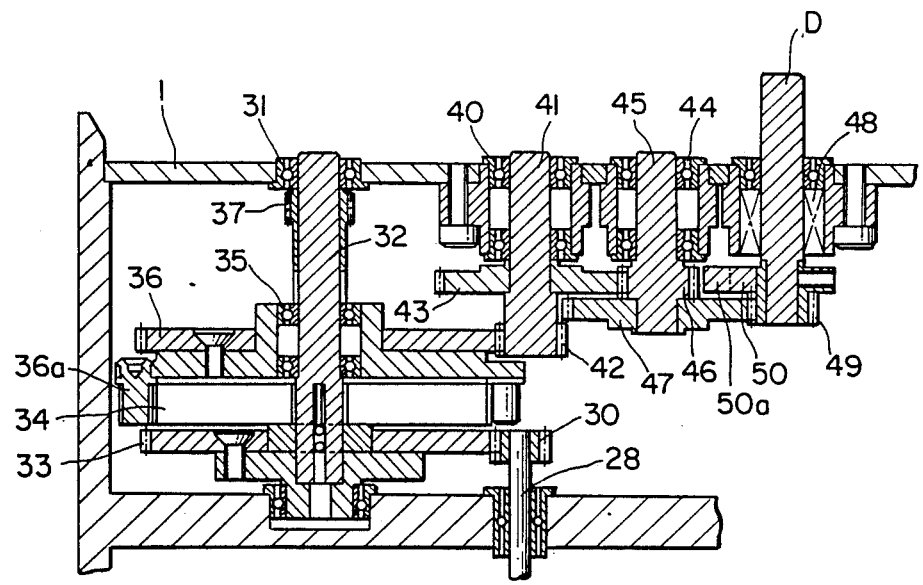
FIG. 6 is a side view of a gear train of the power spring section of the apparatus of the present invention.
Figure 7:
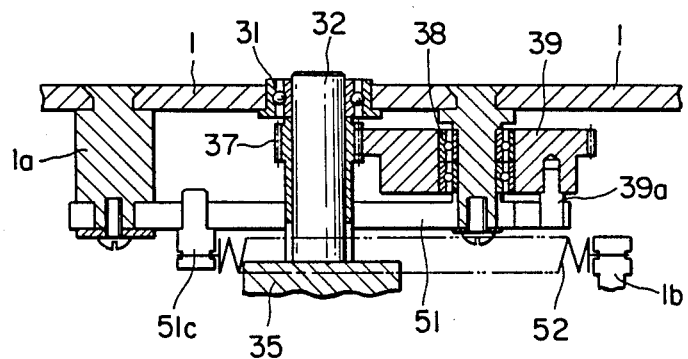
FIG. 7 is a side view of a detent mechanism employed in the power spring section of the apparatus of the present invention.

As shown in FIGS. 5 to 7, a gear 30 is fixedly mounted on the second main shaft 28 while meshed with a gear 33 fixedly mounted on a power spring axle 32 which is rotatably mounted on the stationary frame 1 through a pair of bearings 31.

On the power spring axle 32 is fixedly mounted an inner end portion of a power spring 34 an outer end portion of which is fixedly mounted on a pin 36a of a gear 36 which is rotatably mounted on the power spring axle 32 through a pair of bearings 35.

On the other hand, a pinion 37 is fixedly mounted on the power spring axle 32 as shown in FIG. 6. The pinion 37 of the power spring axle 32 is meshed with a gear 39 which is rotatably mounted on the stationary frame 1 through a pair of bearings 38.

In addition, the gear 36 of the power spring axle 32 is meshed with a small gear 42 of a shaft 41 which is rotatably mounted on the stationary frame 1 through a pair of bearings 40. On the other hand, another gear 43 which is fixedly mounted on the shaft 41 together with the small gear 42 is meshed with a gear 46 fixedly mounted on a shaft 45 which is rotatably mounted on the stationary frame 1 through a pair of bearings 44.

As shown in FIG. 6, gear 47 fixedly mounted on the shaft 45 is meshed with a small gear 49 fixedly mounted on a torque-output shaft D. Consequently, when the power spring 34 releases its accumulated driving force or torque to rotatably drive the gear 36, the rotation speed of the gear 36 is increased through a gear train 36, 42, 43, 46, 47 and 49 to enable the torque-output shaft D to rotate at a high speed.

As shown in FIGS. 5 and 6, to the small gear 49 is fixed a ratchet wheel 50 provided with a pawl portion 50a which engages with a pawl portion 51a of a substantially V-shaped locking arm 51 which is rotatably mounted on a pin 1a of the stationary frame 1. The ratchet wheel 50 prevents the gear 36 from being rotatably driven by the power spring 34 in a direction of an arrow "a" shown in FIG. 5.

As is clear from FIG. 5, the V-shaped locking arm 51 is also provided with an arm portion 51b which is adapted to abut on a projection or pin 39a which is fixed to the gear 39. When the gear 39 rotates in a direction of an arrow shown in FIG. 5, the gear 39 pushes the arm portion 51b of the locking arm 51 with its pin 39a causing the pawl portion 51a of the locking arm 51 to be disengaged from the pawl portion 50a of the ratchet wheel 50, which enables the ratchet wheel 50 to freely rotate on the torque-output shaft D.

As a result, the power spring 34 is released from its locking condition to drive the torque-output shaft D at a stretch.

As shown in FIG. 5, a tension spring 52 is provided between a pin 51c of the locking arm 51 and a pin 1b of the stationary frame 1 to make it possible that the pin 39a abuts on a back surface of the locking arm 51 after the pin 39a is disengaged from the arm portion 51b of the locking arm 51.

Consequently, after completion of release of the accumulated torque of the power spring 34, the pawl portion 51a of the locking arm 51 is engaged with the pawl portion 50a of the ratchet wheel 50 again to prevent the power spring 34 from being further unwound.

As described above, when the unidirectional rotation is given to the second main shaft 28, the power spring axle 32 is rotatably driven to wind up the power spring so as to accumulate the torque therein.

When the torque accumulated in the power spring 34 reaches a predetermined value or when the power spring 34 is wound up by a predetermined number of turns, the gear 39 meshed with the pinion 37 of the power spring axle 32 substantially completes its one turn to enable its pin 39a to push the arm portion 51b of the locking arm 51 backward so as to release the ratchet wheel 50 from its locking condition.

As a result, the gear 36 is rotatably driven by the power spring 34 to drive the torque-output shaft D at a stretch. After completion of unwinding operation of the power spring 34, the pawl portion 51a of the locking arm 51 engages again with the pawl portion 50a of the ratchet wheel 50 under the influence of a resilient force exerted by the tension spring 52. This engagement established between the pawl portions 51a, 50a is enhanced by the pin 39a of the gear 39, which pin 39a pushes the back surface of the locking arm 51 forward, so that the power spring 34 is prevented from being unwound.

As described above, in the apparatus of the present invention, the torque derived from the extrinsic useless oscillation motions such as those of ocean waves and the like is temporally accumulated in the power spring 34 until the thus accumulated torque reaches a predetermined value, and then, after the accumulated torque reaches the predetermined value, the power spring 34 releases the torque at a stretch to drive the torque-output shaft D. As is clear from the above description, in the apparatus of the present invention, the torque accumulating operation and the release operation of the thus accumulated torque are alternately conducted.

In the apparatus of the present invention, the torque accumulating operation and the release operation of the accumulated torque are adjustable in operation period or cycle by changing gear ratios of the gears employed in the apparatus and strength of the power spring 34.

In use, the stationary frame 1 of the apparatus of the present invention is fixedly mounted on a suitable supporting floor of an apparatus's carrier such as marine vessels and land vehicles, so that the extrinsic useless oscillation motions such as those of ocean waves and the like, to which motions the apparatus's carrier or stationary frame 1 of the apparatus of the present invention is subjected, are efficiently converted into a useful unidirectional constant torque regardless of variations in direction, amplitude and cycle of such oscillation motions. In the apparatus of the present invention, the torque is temporally accumulated in the power spring to enable it to release a considerably large unidirectional constant torque at a stretch.

As a result, the apparatus of the present invention can drive a desired instrument such as an electric generator and the like for driving an electric motor and the like.

What is claimed is:

1. An apparatus for converting extrinsic useless oscillation motions such as those of ocean waves and the like into a useful constant torque, comprising:
    a stationary frame;
    a pair of horizontal rotating axles substantially perpendicular to each other, one of which axles is rotatably mounted on said stationary frame of said apparatus to constitute a first rotating axle while the other of which axles is rotatably mounted on said first rotating axle to constitute a second rotating axle;
    swinging pendulums each of which is fixedly mounted on each of said rotating axles for rotatably driving said rotating axles under the influence of said extrinsic oscillation motions to which said swinging pendulums are subjected.
    a unidirectional rotating means mounted on each of said rotating axles and an auxiliary axle for converting rotational motions of each of said rotating axles into a unidirectional rotation of said unidirectional rotating means; and
    a gear train for combining said unidirectional rotation of said unidirectional rotating means into a unidirectional rotation of a torque-output shaft.

2. An apparatus for converting extrinsic useless oscillation motions such as those of ocean waves and the like into a useful constant torque, comprising:
    a stationary frame;
    a first rotating axle rotatably mounted on said stationary frame, said first rotating axle being swingably driven by a first swinging pendulum under the influence of said extrinsic useless oscillation motions, said first swinging pendulum being fixedly mounted on said first rotating axle;
    a first unidirectional-rotation gear rotatably mounted on an auxiliary axle through a unidirectional rotating means on which is fixedly mounted an intermediate gear meshed with a primary gear fixedly mounted on said first rotating axle; and
    a second unidirectional-rotation gear rotatably mounted on said first rotating axle through a unidirectional rotating means so as to be driven by said first rotating axle in the same direction as that of said first unidirectional-rotation gear;
    said first and second unidirectional-rotation gears being meshed with a torque-output gear fixedly mounted on a main shaft.

3. An apparatus for converting extrinsic useless oscillation motions such as those of ocean waves and the like into a useful constant torque, comprising:
    a stationary frame;
    a pair of horizontal rotating axles substantially perpendicular to each other, one of which axles is rotatably mounted on said stationary frame of said apparatus to constitute a first rotating axle while the other of which axles is rotatably mounted on said first rotating axle to constitute a second rotating axle, on which said rotating axle swinging pendulums are fixedly mounted, said rotating axles being rotatably driven by said swinging pendulums under the influence of said extrinsic useless oscillation motions;
    a main shaft for being rotatably driven by said rotating axles and an auxiliary axle through unidirectional-rotating means;
    a power spring axle to which an inner end portion of a power spring is fixedly mounted, said power spring being driven by said power spring axle;
    a power spring gear to which an outer end portion of said power spring is fixedly mounted, said power spring gear being rotatably mounted on said power spring axle;
    a ratchet wheel rotatably driven together with a ratchet gear of a gear train meshed with said power spring gear;
    a detent means for preventing said ratchet wheel from rotating; and
    a releasing means for releasing said ratchet wheel from said detent means, said releasing means being fixedly mounted on a first gear meshed with a second gear of said power spring axle.

* * * * *